(12) United States Patent
Hlava et al.

(10) Patent No.: US 8,046,212 B1
(45) Date of Patent: Oct. 25, 2011

(54) IDENTIFICATION OF CHEMICAL NAMES IN TEXT-CONTAINING DOCUMENTS

(75) Inventors: Marjorie M. K. Hlava, Albuquerque, NM (US); C. Scott Roberts, Albuquerque, NM (US)

(73) Assignee: Access Innovations, Albuquerque, NM (US)

( * ) Notice: Subject to any disclaimer, the term of this patent is extended or adjusted under 35 U.S.C. 154(b) by 1529 days.

(21) Appl. No.: 10/935,345

(22) Filed: Sep. 7, 2004

Related U.S. Application Data

(60) Provisional application No. 60/516,038, filed on Oct. 31, 2003.

(51) Int. Cl.
*G06F 17/27* (2006.01)
(52) U.S. Cl. .................. 704/7; 707/602; 707/603; 704/9
(58) Field of Classification Search .................. None
See application file for complete search history.

(56) References Cited

U.S. PATENT DOCUMENTS

| | | | |
|---|---|---|---|
| 6,332,138 B1 * | 12/2001 | Hull et al. | 707/5 |
| 2002/0169755 A1 * | 11/2002 | Framroze et al. | 707/3 |
| 2005/0065776 A1 * | 3/2005 | Coden et al. | 704/10 |

OTHER PUBLICATIONS

Chowdhury et al. (J. Chem. Inf. Comput. Sci., vol. 32, p. 463-467, 1992).*
Kemp et al. (J. Chem. Inf. Comput. Sci., vol. 38, p. 544-551, 1998).*
Murray-Rust et al. (New J. Chem., vol. 25, p. 618-634, 2001).*
Wilbur et al. (Proc AMIA Symp., p. 176-180, 1999).*
Zamora et al. (J. Chem. Inf. Comput. Sci, vol. 24, p. 176-181, 1984).*

* cited by examiner

*Primary Examiner* — Karlheinz R Skowronek
(74) *Attorney, Agent, or Firm* — Jeffrey D. Myers; Justin R. Jackson; Peacock Myers, P.C.

(57) ABSTRACT

A method and computer software for rapid searching of text-containing documents and identifying and isolating chemical names and common chemical expressions from surrounding text. The chemical names are returned to the user in a list which is arranged in descending order based on the number of occurrences of each chemical name. The list can also contain all synonyms for each chemical name found.

3 Claims, 3 Drawing Sheets

IDENTIFICATION OF CHEMICAL NAMES IN TEXT-CONTAINING DOCUMENTS

CROSS-REFERENCE TO RELATED APPLICATIONS

This application claims the benefit of the filing of U.S. Provisional Patent Application Ser. No. 60/516,038, entitled "Method, Apparatus, and Software for Identifying Chemical Names", filed on Oct. 31, 2003, and the specification thereof is incorporated herein by reference.

INCORPORATION BY REFERENCE OF MATERIAL SUBMITTED ON A COMPACT DISC

A compact disc appendix is included containing computer program code listings pursuant to 37 C.F.R. 1.52(e) and is hereby incorporated by reference in its entirety. The total number of compact discs is 1 including 18 files and 904,178 bytes. The files included on the compact disc are listed in a file entitled "dir_s" on the compact disc. The required listing of file names, dates of creation and sizes in bytes is included in the file dir_s on the compact disk and incorporated by reference herein.

COPYRIGHTED MATERIAL

© 2003-2004 Access Innovations, Inc. A portion of the disclosure of this patent document contains material that is subject to copyright protection. The owner has no objection to the facsimile reproduction by anyone of the patent document or the patent disclosure, as it appears in the Patent and Trademark Office patent file or records, but otherwise reserves all copyrights whatsoever.

BACKGROUND OF THE INVENTION

1. Field of the Invention (Technical Field)

The present invention relates to a method, algorithm, and software for identifying chemical names in electronic documents. Particularly, the present invention enables a user to quickly locate all chemical names in documents, even when such documents are exceedingly large.

2. Description of Related Art

People wishing to review chemical names which are disclosed in documents must thoroughly search the entire document. Not only can this be an extremely time-consuming task, but it also is prone to overlooking some chemical names. While a user can reduce the risk of overlooking chemical terms by slowly reviewing the document, this only increases the time required to review the document. Because large documents can span hundreds, if not thousands, of pages, and may contain only a handful of chemical names, finding each of the few chemical names is like locating a needle in a haystack. There is thus a present need for an automated process for locating chemical names and terms in a text-containing document.

BRIEF SUMMARY OF THE INVENTION

The present invention is directed to a method, algorithm, and software to discern chemical names from surrounding text in a text-containing document.

A primary object of the present invention is to identify chemical names from surrounding text.

A primary advantage of the present invention is that a user is afforded the ability to quickly locate chemical names in documents, particularly large documents which would require considerable time to manually search.

The present invention is of software and a method for searching chemical names in one or more text-containing documents, comprising: comparing each word of the text-containing documents to a list of non-chemical words; comparing each word of the text-containing documents which does not match a word from the list of non-chemical words with a list of chemical names; and comparing each word of the text-containing documents which does not match any name contained in the list of chemical names with one or more regular expressions which contain an element selected from the list consisting of chemical prefixes, chemical suffixes, and combinations thereof. In the preferred embodiment, the invention further compares each word of the text-containing documents which does not match a word from the list of non-chemical words with one or more regular expressions. The chemical names are distinguished from the non-chemical names, and preferably chemical terms are identified which have been distinguished from the non-chemical names which are not used in the text-containing documents as part of a chemical name. The chemical names can be bolded, placed in a list, and/or had synonyms obtained (optionally wherein the synonyms are displayed along with the chemical names). Non-individual chemical names can be grouped. Individual chemical names can be identified and expanded. The number of occurrences of each of the chemical names can also be calculated.

Other objects, advantages and novel features, and further scope of applicability of the present invention will be set forth in part in the detailed description to follow, taken in conjunction with the accompanying drawings, and in part will become apparent to those skilled in the art upon examination of the following, or may be learned by practice of the invention. The objects and advantages of the invention may be realized and attained by means of the instrumentalities and combinations particularly pointed out in the appended claims.

BRIEF DESCRIPTION OF THE SEVERAL VIEWS OF THE DRAWINGS

The accompanying drawings, which are incorporated into and form a part of the specification, illustrate one or more embodiments of the present invention and, together with the description, serve to explain the principles of the invention. The drawings are only for the purpose of illustrating one or more preferred embodiments of the invention and are not to be construed as limiting the invention. In the drawings.

DETAILED DESCRIPTION OF THE INVENTION

Figure 1:
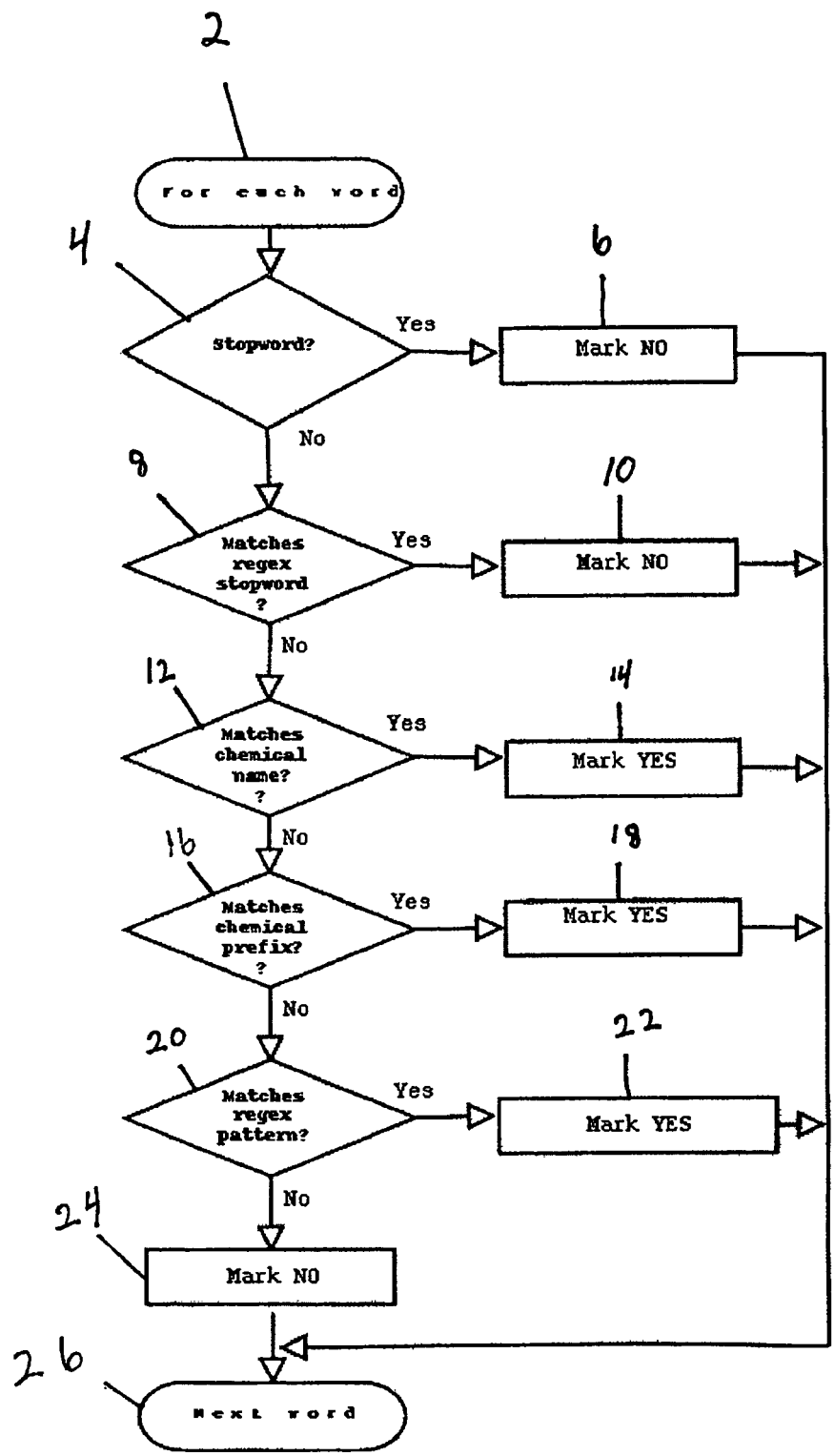
FIG. 1 is a flowchart depicting a preferred flow of logic of the searching algorithm of the present invention.

The term "text-containing document" as used throughout the specification and claims is not limited strictly to a document which contains only text. Rather, the term is intended to cover any document of any format which contains any text. As such, the term includes files which contain both text and images.

The term "chemical name" as used throughout the specification and claims is used for simplicity and is intended to include all chemical names, chemical compounds, symbols, and expressions, including common chemical names.

A preferred embodiment of the present invention is more fully disclosed in the material incorporated by reference on compact disc. While the preferred embodiment of the invention is primarily directed to identifying chemical names, the invention is useful in any technology area having a lexicon for which word identification is desirable. In those instances, one skilled in the art will recognize that the searching terms, methods, algorithms and software can be adapted to search for words, phrases, and symbols of such lexicon.

A computer program according to the present invention is particularly useful for finding chemical names in text-containing documents. While any text-containing document can be searched, the present invention produces particularly desirable results when used to search patents and journal articles. The challenge in searching such documents is that there are an unlimited number of potential chemical compounds, and a variety of ways that a particular compound can be named. It is thus impractical to simply match names against text.

The present invention processes the text of the text-containing document against regular expressions that match typical chemical morphemes, such as "hydro" or "amine", to see if they occur in words. This works well as a first approximation, but additional comparisons produce more desirable results, for example, to distinguish between the non-chemical word "hydrophobia" and a legitimate chemical name "hydrogen sulfate".

Software of the present invention can be set up to run as a stand-alone program or over a network. In the latter case, a simple HTTP server is preferably set to run such that it loads the word lists described below (except for the synonym table) and waits for messages. A client program then preferably transmits a text-containing document, such as a patent, to the server. After the server runs a program according to the present invention in conjunction with the text-containing document, the server then preferably sends the client a list of all chemical names contained in the original text-containing document.

The text is preferably loaded into memory and split into words. Any beginning or ending punctuation is preferably removed except for parentheses, which are preferably retained. In the first pass through the text, each word is preferably compared against various lists that have been read into memory. The comparisons preferably proceed in the following order:

1. Stopwords. The stopwords list is preferably a very large list of non-chemical words which can be stored internally in a hash table. As such, comparisons are very quick. This step serves two purposes. First, time is saved since a later step requires passing each remaining word through a set of regular expressions. Second, words are removed that will be matched by the regular expressions, but are not chemical names. For example, "hydrophobia" will be matched with the regular expression /hydro/, but is not a chemical name.
2. Regular expression stopwords. This list preferably contains only a very small number of regular expressions which eliminate other strings that may occur. For example, any number standing alone can be eliminated.
3. Chemical names. These are also preferably stored as a hash table, and mark exact matches. The list preferably includes all element names, as well as common words for chemicals that will not be picked up by regular expressions, such as "salt" or "soda".
4. Chemical name starts. These are regular expressions that often start long compounds, such as \(\d\)—which will match (1)—.
5. Regular expressions. These are common chemical morphemes that will show up in long compound names, such as "hydro", "sulf", or "oxy". As previously mentioned, it is preferable that non-chemical names, such as "proxy", have already been eliminated by being listed in the stop-word list.

The list of regular expressions is preferably kept short. This is because each one has to be processed against each word. For example, particularly desirable results can be obtained when there are about 100 regular expressions. Since the stop word list greatly reduces the number of words that must be tested, a more lengthy stop word list enables a more lengthy regular expression list to be searched in a short time period.

The first pass preferably marks each word as chemical or non-chemical. On the second pass through the text, the present invention preferably groups the chemical words into actual chemical terms, such as "hydrogen peroxide", and not two terms such as "hydrogen" and "peroxide". Also, there are certain words that are preferably only be included if they are part of a longer term. For example, "acid" by itself is not a chemical, but "hydrochloric acid" is. Similarly, certain adjectives, like "linear" can be the beginning of a chemical name, but should not be included if it is not followed by a chemical word.

Each succession of marked words is looked at. If a word in the "beginners" list (like "linear") is found but is not followed by another marked word, it is preferably eliminated. Similarly, if a word in the "enders" list (like "acid") is found but is not preceded by another marked word, it is preferably eliminated. Further, the present invention preferably attempts to identify chemical words separated by non-chemical words which have common endings or beginnings. For example, "sodium and potassium sulfates" is preferably returned as "sodium sulfates" and "potassium sulfates".

Once all word combinations are gathered, each one is preferably compared against a database of synonyms. Finally, chemical names, plus any synonyms found in this database are indicated to a user.

FIG. 1 depicts a flowchart of a preferred algorithm of the present invention. As depicted therein, each word 2 of the text-containing document is preferably passed through the algorithm. Word 2 is preferably first compared to a large list of words which are known not to be chemical names 4. If word 2 is found to be within the list, the word is preferably indicated as not being a chemical name 6. If, however, word 2 does not match any entry in the list of stop words 4, it is preferably compared to other text which is known not to exist within chemical names 8. For example, a number which has one or more spaces after it will not be associated with a chemical name. While this can be achieved in a number of ways, it is preferable that a regular expression be used to achieve the function of block 8. If word 2 does fit the criterion of block 8, word 2 is preferably indicated as not being a chemical name 10. If, on the other hand, word 2 does not fit the criterion of block 8, word 2 is preferably searched for known chemical names in block 12. If word 2 is determined to match a known chemical name in block 12, it is preferably indicated as being a chemical name 14. If word 2 does not match any of the chemical names contained in block 14, word 2 is then preferably searched for a term which is known to start long chemical names, such as a number directly next to a word. This is represented by block 16. When a match between word 2 and a known prefix is found to exist, word 2 is preferably indicated as being a chemical name. If, however, no match is found to exist, word 2 is then preferably searched for a chemical name prefix as illustrated by box 20. Upon determining that word 2 matches a known chemical prefix, word 2 is preferably indicated as being a chemical name. If word 2 does not match any of the known chemical prefixes of block 20, it is preferable that word 2 be indicated as not being a chemical name. The next word in the text-containing document is then preferably searched in a like manner.

Figure 2:
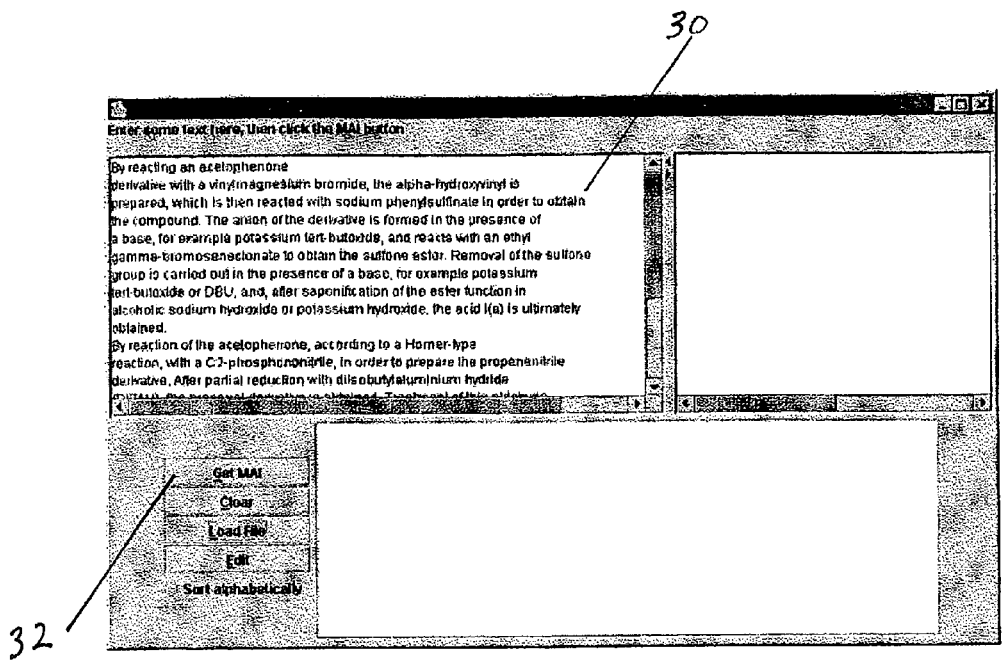
FIG. 2 is a computer-screen printout showing a user interface of software of the present invention which has text entered into a window thereof.

FIG. 2 depicts a computer-screen printout wherein a short segment of text from a patent has been loaded into window 30 of a program of the present invention, which is used for fine-tuning the word lists. To operate the program depicted in FIG. 2, a user preferably clicks on Get MAI button 32 after text has been loaded into window 30.

Figure 3:
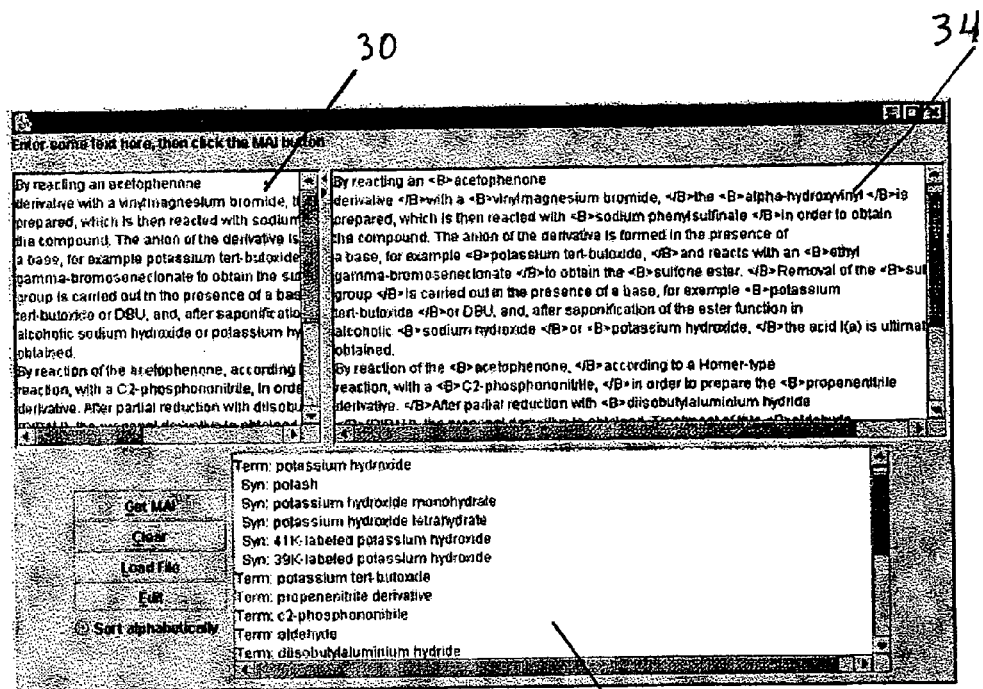
FIG. 3 is a computer-screen printout showing a user interface of software according to the present invention with results generated from the software displayed in two windows of the interface.

FIG. 3 shows an example of results returned in window 36 after the user clicks on Get MAI 32. As depicted therein, in window 34, the original text is preferably repeated with the chemical names surrounded by <B> </B> tags (this would mark them as bold if the text were copied into a web page). Of course it is not essential that the bold tags be disposed around chemical words. While not required, window 36 also preferably displays all synonyms associated with each chemical name found. The chemical words and terms can be copied into a separate list. Optionally, the chemical words can be sorted alphabetically. They can be listed for each time that they occur, or a counter can optionally be incorporated which will list the number of occurrences next to each chemical name. Further, they can be arranged in order of decreasing frequency of occurrence or in any other order known to those skilled in the art.

Upon reading this specification and the material in the CD-ROM appendix, those skilled in the art will readily recognize that one or more steps of the present invention can be negated while desirable results are still produced.

Although the invention has been described in detail with particular reference to these preferred embodiments, other embodiments can achieve the same results. Variations and modifications of the present invention will be obvious to those skilled in the art and it is intended to cover in the appended claims all such modifications and equivalents. The entire disclosures of all references, applications, patents, and publications cited above and/or in the attachments, and of the corresponding application(s), are hereby incorporated by reference.

What is claimed is:

1. A software-based method for searching chemical names in one or more text-containing documents that have been loaded into computer memory, said method comprising the steps as follows:
    a) The text of the text-containing document is split into separate words, with all beginning and ending punctuation removed except for parentheses;
    b) Each word of the text-containing documents is compared to a stopword list of non-chemical words that is stored in a hash table and the words in the text that match words in the list are dropped from further consideration as potential chemical references;
    c) Each word of the text-containing documents is compared to a stopword list of regular expressions that is stored in a hash table with the strings in the text that match expressions in the list being dropped from further consideration as potential chemical references;
    d) Each word of the text-containing documents which has not already been dropped from consideration is compared to a list of chemical names (including common terms for chemicals) stored as a hash table, with exact matches being flagged as chemical names or parts thereof;
    e) Each word of the text-containing documents which has not already been dropped from consideration as a chemical name is compared to a list of regular expressions which often start long compound chemical names, with words whose initial characters constitute matches being flagged as chemical names or parts thereof;
    f) The character sequences in each word of the text-containing documents which has not already been dropped from consideration as a chemical name is compared with one or more regular expressions which contain an element included in a list consisting of common chemical morphemes, with the words containing such morphemes being flagged as chemical names or parts thereof;
    g) Each succession of marked words in the text-containing documents is compared against a database of chemical names, with groupings that match the database being flagged as chemical names, and the remaining strings that have intervening non-chemical words, and common prefixes and suffixes are identified as multiple chemical terms;
    h) Each word or word combination in the text-containing documents that has been identified as a chemical name in any of the preceding steps is compared against a database of synonyms and, in cases for which there are one or more synonyms, the chemical names occurring in the text are associated with the corresponding synonyms;
    i) The number of occurrences of each chemical name, and of each combination of words indicating a chemical name, is determined; and
    j) Output via computer provides an indication of the results of the search to a user, said results including the chemical names discovered.

2. The method of claim 1 wherein output via computer provides an indication of the results of the search in descending order of number of occurrences in the text-containing documents.

3. The method of claim 1 wherein output via computer provides an indication of the results of the search in synonyms.

* * * * *